United States Patent Office 3,459,768
Patented Aug. 5, 1969

3,459,768
PYRROLIDINE-2,2-DIMETHANOLS AND METHODS OF PREPARING THE SAME
Harold G. Monsimer, Moorestown, N.J., and Philip P. Grous, Philadelphia, Pa., assignors to Richardson-Merrell Inc., New York, N.Y., a corporation of Delaware
No Drawing. Filed May 24, 1966, Ser. No. 552,398
Int. Cl. C07d 27/04
U.S. Cl. 260—326.5                                6 Claims

ABSTRACT OF THE DISCLOSURE

Compounds having the formula:

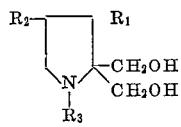

in which $R_1$ and $R_2$ are members of the group consisting of hydrogen and lower alkyl, and $R_3$ is a member of the group consisting of hydrogen, lower alkyl, acetyl, benzyl, trimethoxybenzyl, phenethyl, diphenylloweralkyl, formyl, allyl, propargyl, phenyl, phenoxyloweralkyl, diloweralkylaminoloweralkyl, and phenylsulfonylloweralkyl, and the therapeutically acceptable acid addition salts thereof have useful anti-inflammatory activity. They may be prepared by reducing an appropriate 5,5-dicarboxy-2-pyrrolidinone with lithium aluminum hydride.

---

This invention relates to new chemical compounds which have useful physiological properties and are also useful as intermediates for the preparation of other chemical compounds.

The compounds of this invention are pyrrolidine-2,2-dimethanols having the formula:

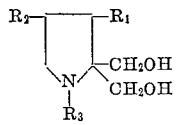

in which $R_1$, $R_2$ may be hydrogen or lower alkyl, and $R_3$ may be hydrogen, lower alkyl, acyl, aralkyl, dialkylaminoalkyl, alkenyl, alkynyl, aryloxyalkyl, and arylsulfonylalkyl. The invention also includes the therapeutically acceptable acid addition salts of the above pyrrolidine-2,2-dimethanols.

The pyrrolidine dimethanols of this invention are conveniently prepared by reduction of the corresponding 5,5-dicarbethoxy-2-pyrrolidinone with lithium aluminum hydride. This reduction may be carried out at temperatures of 35 to 100° C. for four to sixteen hours in the solvents usually used in this type of reduction such as tetrahydrofuran, ether, and ethyleneglycoldimethyl ether.

The 1-substituted pyrrolidine-2,2-dimethanols are conveniently prepared by reacting an unsubstituted or a 3- or 4-substituted pyrrolidine-2,2-dimethanol with an alkyl, alkenyl, or alkynyl halide in the presence of an acid acceptor such as potassium carbonate, triethylamine, et cetera. The reaction is carried out at a temperature of 35 to 120° C. in a suitable solvent such as methanol, ethanol, butanol, ether benzene, et cetera; however, the polar solvents are preferred.

The N-methyl derivatives are also prepared by the lithium aluminum hydride reduction of the corresponding N-formyl derivative or by the Clark-Eschweiler modification of the Leuekart reaction.

The compounds of this invention show anti-inflammatory activity in the carrageenin abscess test and some also have CNS activity. Because of the unique arrangement of alcohol functions in the molecule, the compounds are useful in the preparation of other chemical compounds.

EXAMPLE 1

4-methylpyrrolidine-2,2-dimethanol

To a slurry of 75.9 grams of lithium aluminum hydride in 400 milliliters of tetrahydrofuran is added slowly with stirring 148.5 grams of 5,5-dicarbethoxy-4-methyl-2-pyrrolidinone in one liter of tetrahydrofuran. The reaction mixture is heated under reflux with stirring for four hours and decomposed by adding 130 milliliters of 5 percent aqueous sodium hydroxide and 250 milliliters of saturated aqueous sodium sulfate. The reaction mixture is dried by stirring for thirty minutes with 40 grams of anhydrous sodium sulfate and filtered. The filtrate is concentrated under reduced pressure and the residue distilled to yield 85 grams of 4-methyl-pyrrolidine-2,2-dimethanol, boiling point 135 to 150° C. (3.5 millimeters). Crystallization from benzene gives a solid, melting point 89 to 91° C.

EXAMPLE 2

3-methylpyrrolidine-2,2-dimethanol 3-methylpyrrolidine-2,2-dimethanol, 4.0 grams, melting point 94 to 96.5° C., is prepared by the procedure of Example 1 employing 27.7 grams of 5,5-dicarbethoxy-3-methyl-2-pyrrolidinone and 14.2 grams of lithium aluminum hydride as the reactants.

EXAMPLE 3

Pyrrolidine-2,2-dimethanol

Pyrrolidine-2,2-dimethanol, 15 grams, melting point 75 to 77° C., is prepared by the procedure of Example 1 employing 46 grams of 5,5-dicarbethoxy-2-pyrrolidinone and 25.1 grams of lithium aluminum hydride as the reactants.

EXAMPLE 4

1-acetyl-4-methylpyrrolidine-2,2-dimethanol diacetate

To a mixture of 10 grams of 4-methylpyrrolidine-2,2-dimethanol and 30 milliliters of triethylamine in 200 milliliters of water. The layers are separated, the aqueous stirring, 40 grams of acetyl chloride. The reaction mixture is stirred eight hours at room temperature, allowed to stand overnight and decomposed by adding 100 milliliters of water. The layers are separated, the aqueous layer is washed with methylene chloride and the combined organic layers washed with 5 percent sodium bicarbonate, 10 percent hydrochloric acid and water. The organic fraction is dried over anhydrous magnesium sulfate, concentrated under reduced pressure and the residue distilled to yield 21.5 grams of 1-acetyl-4-methyl-pyrrolidine-2,2-dimethanol diacetate, boiling point 144 to 145° C. (0.08 mm.) $n_D^{25}$ 1.4675.

EXAMPLE 5

1-acetyl-4-methylpyrrolidine-2,2-dimethanol

A mixture of 16.5 grams of 1-acetyl-4-methylpyrrolidine-2,2-dimethanol diacetate, 30 grams of potassium carbonate and 10 milliliters of methanol in 200 milliliters of water is heated on a steam bath for four hours. The solution is concentrated to approximately one half volume, saturated with potassium carbonate and extracted with methylene chloride. The methylene chloride extract is dried over anhydrous magnesium sulfate, filtered and concentrated to dryness. The residue is crystallized from methanol to yield 3 grams of 1-acetyl-4-methylpyrrolidine-2,2-dimethanol, melting point 93 to 93.5° C.

EXAMPLE 6

1-formyl-4-methylpyrrolidine-2,2-dimethanol

To 14.5 grams of 4-methylpyrrolidine-2,2-dimethanol is added with stirring and cooling of 14.7 grams chloral. After ten minutes, the cooling is discontinued. The reaction is stirred at room temperature for two hours and heated on a steam bath for thirty minutes. The chloroform which forms during the reaction is removed under reduced pressure and the residue crystallized from tetrahydrofuran to yield 9.3 grams of 1-formyl-4-methylpyrrolidine-2,2-dimethanol, melting point 118 to 120.5° C.

EXAMPLE 7

1,4-dimethylpyrrolidine-2,2-dimethanol—Method A

To a slurry of 16.3 grams of lithium aluminum hydride in 170 milliliters of ethylene glycol dimethyl ether is added, slowly with stirring, 67.4 grams of 1-formyl-4-methylpyrrolidine-2,2-dimethanol in 600 milliliters of hot ethylene glycol dimethyl ether. The reaction mixture is heated under reflux for four hours, cooled in an ice bath and decomposed by adding 15 milliliters of water and 50 milliliters of saturated aqueous sodium sulfate. The reaction mixture is dried by stirring with 20 grams of anhydrous sodium sulfate for thirty minutes, filtered and the filtrate concentrated under reduced pressure. The residue is fractionally distilled to yield 19 grams of 1,4-dimethylpyrrolidine-2,2-dimethanol, boiling point 88 to 90° C. (0.07 mm.), $n_D^{24}$ 1.4871.

EXAMPLE 8

1,4-dimethylpyrrolidine-2,2-dimethanol—Method B

To a mixture of 52.4 grams of 88 percent aqueous formic acid and 29 grams of 4-methylpyrrolidine-2,2-dimethanol at zero degrees is added 30 milliliters of 37 percent aqueous formaldehyde. The reaction mixture is stirred at zero degrees for 20 minutes, heated under reflux for 24 hours, cooled, 100 milliliters of 5 percent hydrochloric acid added and concentrated to dryness under reduced pressure. The residual oil is dissolved in 30 milliliters of water, made strongly basic with 40 grams of sodium hydroxide and extracted with chloroform. The organic layer is dried over anhydrous magnesium sulfate, the solvent removed under reduced pressure, and the residue distilled to yield 15.9 grams of 1,4-dimethylpyrrolidine-2,2-dimethanol, boiling point 98–99° C. (0.08 mm.), $n_D^{26}$ 1.4864.

EXAMPLE 9

1-(3,3-diphenylpropyl)-4-methylpyrrolidine-2,2-dimethanol

A mixture of 8 grams of 4-methylpyrrolidine-2,2-dimethanol, 15.2 grams of 1-bromo-3,3-diphenylpropane, and 15.2 grams of powdered anhydrous potassium carbonate in 70 milliliters of n-butanol is heated under reflux with stirring for twenty-four hours. The reaction mixture is cooled to room temperature and washed with water and 10 perecnt hydrochloric acid. The butanol layer is concentrated to dryness to give 19 grams of crude hydrochloride which is crystallized from water to yield 8.5 grams of 1-(3,3-diphenylpropyl)-4-methyl-pyrrolidine-2,2 - dimethanol hydrochloride, melting point 192 to 194° C.

EXAMPLE 10

1-benzyl-4-methylpyrrolidine-2,2-dimethanol

A mixture of 8 grams of 4-methylpyrrolidine-2,2-dimethanol, 7 grams of benzylchloride, and 15 grams of powdered anhydrous potassium carbonate in 70 milliliters of n-butanol is heated under reflux with stirring for twenty-four hours. The reaction mixture is cooled to room temperature, washed with water and evaporated to dryness. The residue was dissolved in anhydrous ether, treated with an ethanolic solution of hydrogen chloride, evaporated to dryness under reduced pressure, and the residue crystallized from isopropanol-ether to yield 6.5 grams of 1-benzyl-4-methylpyrrolidine-2,2-dimethanol hydrochloride, melting point 167 to 168.5° C.

EXAMPLE 11

4-methyl-1-(2-phenoxyethyl)pyrrolidine-2,2-dimethanol

A mixture of 8 grams of 4-methylpyrrolidine-2,2-dimethanol, 11.1 grams of β-bromophenatole, and 15.2 grams of powdered potassium carbonate in 70 milliliters of n-butanol is heated under reflux for twenty-four hours. The reaction mixture is cooled to room temperature, washed with water, and evaporated to dryness. The residue is dissolved in isopropanol and added to a solution of 5 grams of fumaric acid in isopropanol. The solvent is evaporated under reduced pressure and the residue crystallized from methanol to yield 10 grams of 4-methyl-1-(2 - phenoxyethyl)pyrrolidine-2,2-dimethanol hemifumarate, melting point 166 to 169° C.

EXAMPLE 12

4-methyl-1-phenethylpyrrolidine-2,2-dimethanol 4-methyl-1-phenethylpyrrolidine - 2,2 - dimethanol is prepared by the procedure of Example 11 employing 8.7 grams of 4-methylpyrrolidine-2,2-dimethanol, 10.3 grams of phenethylbromide, and 4.2 grams of potassium carbonate as the reactants. The product is isolated as the hemifumarate salt melting at 180.5 to 181.5° C.

EXAMPLE 13

1-[2-(phenylsulfonyl)ethyl]-4-methylpyrrolidine-2,2-dimethanol

1-[2-(phenylsulfonyl)ethyl] - 4 - methylpyrrolidine-2,2-dimethanol is prepared by the procedure of Example 11 employing 3.84 grams of 4-methylpyrrolidine-2,2-dimethanol, 6.6 grams of 2-(phenylsulfonyl) ethyl bromide and 1.8 grams of potassium carbonate as the reactants. The product is isolated as the hemifumarate salt melting at 136 to 138° C.

EXAMPLE 14

1-[β-(N,N-diethylamino)ethyl]-4-methyl pyrrolidine-2,2-dimethanol

1 - [β - (N,N-diethylamino)ethyl]-4-methylpyrrolidine-2,2-dimethanol is prepared by the procedure of Example 11 employing 10.9 grams of 4-methylpyrrolidine-2,2-diethanol, 12.9 grams of diethylaminoethylchloride hydrochloride and 41.5 grams of potassium carbonate as the reactants. The product is isolated as the difumarate salt melting at 120 to 122° C.

EXAMPLE 15

1-allyl-4-methylpyrrolidine-2,2-dimethanol

1 - allyl-4-methylpyrrolidine-2,2-dimethanol hemifumarate is prepared by the procedure of Example 11 employing 15 grams of 4-methylpyrrolidine-2,2-dimethanol, 13 grams of allylbromide and 27 grams of potassium carbonate as the reactants. The product is isolated as the hemifumarate salt melting at 140 to 143° C.

EXAMPLE 16

4-methyl-1-propargylpyrrolidine-2,2-dimethanol 4-methyl-1-propargylpyrrolidine-2,2-dimethanol is prepared by the procedure of Example 11 employing 15 grams of 4-methylpyrrolidine-2,2-dimethanol, 12 grams of propargylbromide, and 27 grams of potassium carbonate as the reactants. The product is isolated as the hemifumarate salt melting at 107.5 to 108.5° C.

EXAMPLE 17

4-methyl-1-(3,4,5-trimethoxybenzyl)pyrrolidine-2,2-dimethanol 4-methyl - 1 - (3,4,5-trimethoxybenzyl)pyrrolidine-2,2-dimethanol is prepared by the procedure of Example 11 employing 3.4 grams of 4-methylpyrrolidine-2,2-dimethanol, 5 grams of 3,4,5-trimethoxybenzylchloride, and 1.6 grams of potassium carbonate as the reactants. The product is isolated as the hemifumarate salt melting at 151 to 153.5° C.

EXAMPLE 18

1-phenethylpyrrolidine-2,2-dimethanol 1-phenethylpyrrolidine-2,2-dimethanol is prepared by the procedure of Example 10 employing 6.0 grams of pyrrolidino-2,2-dimethanol, 8.5 grams of phenethylbromide, and 3.2 grams of potassium carbonate as the reactants. The product is isolated as the hydrochloride salt melting at 150.5 to 153.5° C.

What is claimed is:
1. 1,4-dimethylpyrrolidine-2,2-dimethanol.
2. 1-[2-(phenylsulfonyl)ethyl] - 4 - methylpyrrolidine-2,2-dimethanol.
3. 1 - [β - (N,N-diethylamino)ethyl]-4-methylpyrrolidine-2,2-dimethanol.
4. 4-methyl-1-propargylpyrrolidine-2,2-dimethanol.
5. A compound of the group consisting of those having the formula:

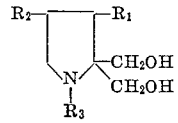

in which $R_1$ and $R_2$ are members of the group consisting of hydrogen and methyl, and $R_3$ is a member of the group consisting of hydrogen, methyl, acetyl, benzyl, trimethoxybenzyl, phenethyl, diphenylpropyl, formyl, allyl, propargyl, phenoxyethyl, diethylaminoethyl, and phenylsulfonylethyl, and the therapeutically acceptable acid addition salts thereof.

6. A method of preparing compounds having the forfula:

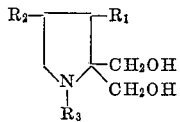

in which $R_1$ and $R_2$ are members of the group consisting of hydrogen and methyl, and $R_3$ is a member of the group consisting of hydrogen, methyl, acetyl, benzyl, trimethoxybenzyl, phenethyl, diphenylpropyl, formyl, allyl, propargyl, phenoxyethyl, diethylaminoethyl, and phenylsulfonylethyl, which comprises reducing a 5,5-dicarboxy-2-pyrrolidinone in which the pyrrolidinone ring has substituents $R_1$, $R_2$, and $R_3$ as defined above with lithium aluminum hydride.

References Cited

UNITED STATES PATENTS 3,185,705  5/1965  Leonard et al. _____ 260—326.3

OTHER REFERENCES

Kim et al., Chemical Abstracts, vol. 63, pp. 4382–83, (1965).

ALEX MAYEL, Primary Examiner

JOSE TOVAR, Assistant Examiner

U.S. Cl. X.R.

260—326; 424—474